US009527993B2

(12) United States Patent
Duc et al.

(10) Patent No.: US 9,527,993 B2
(45) Date of Patent: Dec. 27, 2016

(54) PROCESS TO MAKE A COMPOSITION COMPRISING A MONOVINYLAROMATIC POLYMER AND A POLYMER MADE FROM RENEWABLE RESOURCES

(75) Inventors: Michel Duc, Pau (FR); Philippe Lodefier, Wemmel (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 1216 days.

(21) Appl. No.: 13/055,014

(22) PCT Filed: Jul. 23, 2009

(86) PCT No.: PCT/EP2009/059471
§ 371 (c)(1),
(2), (4) Date: Apr. 11, 2011

(87) PCT Pub. No.: WO2010/010139
PCT Pub. Date: Jan. 28, 2010

(65) Prior Publication Data
US 2011/0207887 A1 Aug. 25, 2011

(30) Foreign Application Priority Data
Jul. 25, 2008 (EP) .................................... 08161165

(51) Int. Cl.
| | | |
|---|---|---|
| C08L 25/08 | (2006.01) | |
| C08L 51/00 | (2006.01) | |
| C08F 279/02 | (2006.01) | |
| C08F 287/00 | (2006.01) | |
| C08L 25/02 | (2006.01) | |
| C08L 51/04 | (2006.01) | |
| C08L 53/02 | (2006.01) | |
| C08L 9/00 | (2006.01) | |
| C08L 51/08 | (2006.01) | |
| C08L 67/04 | (2006.01) | |

(52) U.S. Cl.
CPC ............ C08L 51/006 (2013.01); C08F 279/02 (2013.01); C08F 287/00 (2013.01); C08L 25/02 (2013.01); C08L 51/04 (2013.01); C08L 53/025 (2013.01); C08L 9/00 (2013.01); C08L 51/08 (2013.01); C08L 67/04 (2013.01)

(58) Field of Classification Search
CPC ......... C08L 25/02; C08L 51/006; C08L 51/04; C08L 53/025; C08L 51/08; C08L 67/04; C08L 9/00; C08F 279/02; C08F 287/00
USPC ......... 525/55, 107, 108, 111, 122, 165, 174, 525/177, 185, 190, 418, 450
See application file for complete search history.

(56) References Cited
U.S. PATENT DOCUMENTS
7,160,948 B2 1/2007 Matsuo et al.

FOREIGN PATENT DOCUMENTS

| | | |
|---|---|---|
| JP | 2000-017038 A | 1/2000 |
| JP | 2005-264086 A | 9/2005 |
| JP | 2005-336666 A | 12/2005 |
| JP | 2006328314 A | 12/2006 |
| WO | 92-04413 A1 | 3/1992 |
| WO | 2006097979 A1 | 9/2006 |
| WO | 2007015448 A1 | 2/2007 |
| WO | 2007057422 A1 | 5/2007 |

OTHER PUBLICATIONS

Wu DX, Yang YF, Cheng XH et al, "Mixed molecular brushes with PLLA and PS side chains prepared by AGET ATRP and ring-opening polymerization", Maromolecules, Oct. 6, 2006, pp. 7513-7519, vol. 39 No. 22, Washington, DC, US.
Philippe Zink, Claire-Helene Brachais, Eric Finot, Denise Barbier-Baury, "Nanoscale blends between immiscible polymers via simultaneous non-interfering polymerisation", Macromolecular Chemistry and Physics, Feb. 28, 2005, pp. 553-558, vol. 206, No. 5, Wiley-VCH Verlag, Weinheim, Germany.
Yun Wang, Guangqiang Lu, Junlian Huang: "Copolymerization of the macromonomer polyethylene oxide with styryl end group and styrene in the presence of poly-caprolactone with 2,2,6,6-tetramethylpiperidinyl-1-oxy end group by controlled radical mechanism", Journal of Polymer Science Part A: Polymer Chemistry, Mar. 17, 2004, pp. 2093-2099, vol. 42, No. 9,, Wilmington, DE, US.
D. Bourissou et al., "Recent advances in the controlled preparation of poly($\alpha$-hydroxy acids): Metal-free catalysts and new monomers", C. R. Chimie 10 (2007), p. 775-794.
Kamber et al., "Organocatalytic Ring-Opening Polymerization", Chemical Reviews, Mar. 2007, 107, p. 5813-5840.

(Continued)

*Primary Examiner* — Irina S Zemel
*Assistant Examiner* — Jeffrey Lenihan
(74) *Attorney, Agent, or Firm* — Albert Shung

(57) ABSTRACT

A process to make a composition that includes a monovinylaromatic polymer and a dispersed phase of polymer made from renewable resources may include forming a polymerizable mixture. The polymerizable mixture may include a monomer or dimer dispersed in a monovinylaromatic monomer, and optionally a rubber dissolved in the monovinylaromatic monomer. The process may include contacting a catalyst with the polymerizable solution at conditions effective to produce a polymer dispersed in the monovinylaromatic monomer. The process may include polymerizing through a radical pathway the solution, optionally in the presence of a free radical initiator and a chain transfer agent, to obtain a monovinylaromatic polymer that includes a dispersed phase. The process may include degassing to separate unpolymerized monomers and comonomers, and recovering a composition of monovinylaromatic polymer.

10 Claims, No Drawings

(56) References Cited

OTHER PUBLICATIONS

A. Amgoune, "Ring-Opening Polymerization of Lactide with Group 3 Metal Complexes Supported by Dianionic Alkoxy-Amino-Bisphenolate Ligands: Combining High Activity, Productivity, and Selectivity" Chem. Eur. J. (2006) 12, p. 169-179.

Chen-Xin Cai et al., "Stereoselective ring-opening polymerization of racemic lactide using alkoxy-amino-bis(phenolate) group 3 metal complexes" Chem. Comm. (2004), p. 330-331.

C.K. Williams et al., "A Highly Active Zinc Catalyst for the Controlled Polymerization of Lactide" JACS, (2003) 125, p. 11350-11359.

Ullmann's Encyclopedia of Industrial Chemistry, fifth edition (1995) vol. A26, pp. 655-659.

Geoffrey W. Coates et al., "Discrete Metal-Based Catalysts for the Copolymerization of CO2 and Epoxides: Discovery, Reactivity, Optimization, and Mechanism"; Angew. Chem. Int. Ed. 2004, 43, 6618-6639; Wiley-VCH Verlag GmbH & Co. KGaA, Weinheim.

Willem M. Stevels, et al., "Kinetics and Mechanism of I-Lactide Polymerization Using Two Different Yttrium Alkoxides as Initiators" Macromolecules, (1996) 29, p. 6132-6138.

PROCESS TO MAKE A COMPOSITION COMPRISING A MONOVINYLAROMATIC POLYMER AND A POLYMER MADE FROM RENEWABLE RESOURCES

FIELD OF THE INVENTION

The present invention concerns a process to make a composition comprising a monovinylaromatic polymer and a dispersed phase of a polymer made from renewable resources. Common plastic material production draws on fossil (i.e. non-renewable) reserves thus contributing to the depletion of essential and increasingly scare resources for mankind. Beyond recycling used plastic materials or valorising plastic wastes as fuel in incinerators for heat and electricity supply, it is desirable to incorporate some parts of polymers made from renewable resources in conventional plastics coming from petrochemistry. PLA (Poly(lactic acid)) is probably one of the so-called bio-polymers presenting the highest potential in terms of physical and mechanical properties, but also processability, considered as very close to polystyrene' ones. Other bio-sourced polymers may be contemplated, and more especially biodegradable polyesters such as polyhydroxyalkanoates (PHAs), and polycarbonates made from cyclic carbonates.

BACKGROUND OF THE INVENTION

Japanese patent application published on 29 Sep. 2005 under the No JP 2005-264086 describes blends of polystyrene (PS) and PLA in which PLA is the major part.

Japanese patent application published on 18 Jan. 2000 under the No JP 2000-017038 describes an expandable resin having biodegradability. This composition is made essentially of PLA and comprises 25% or less by weight of PS.

U.S. Pat. No. 7,160,948 in example 1 describes a composition as follows: 26.3% by weight of polylactic acid, 26.3% by weight of polymethyl methacrylate, 11.6% by weight of polyolefin and 35.8% by weight of a block copolymer of methyl methacrylate and styrene, said block copolymer comprising 30% of PS. This means clearly that the polystyrene is not the major part of the composition.

Japanese patent application published on 8 Dec. 2005 under the No JP 2005-336666 describes lactic acid fibers containing by weight 3 to 15% of syndiotactic polystyrene.

WO 92-04413 describes blends of PLA and general purpose polystyrene comprising by weight 10 to 25% of PLA. These blends are made by compounding PLA and PS.

WO 2007015448 describes a resin composition reduced in environmental burden which is excellent in strength, impact resistance, heat resistance, and moldability and which can be produced while attaining a reduction in CO2 discharge amount. The resin composition comprises (A) a styrene resin, (B) an aliphatic polyester, and at least one member selected between (C) a compatibilizing agent and (D) a dicarboxylic anhydride. The compatibilizing agent (C) preferably comprises one or more of the following. (C-1) A polymethyl methacrylate polymer (C-2) A vinyl polymer obtained by copolymerization with an epoxy or an acid anhydride (C-3) A graft polymer obtained by graft-polymerizing methyl methacrylate with a rubbery polymer (C-4) A block copolymer comprising a polylactic acid segment and a vinyl polymer segment bonded thereto. Said composition is made by compounding.

WO2006097979 describes a vegetable resin composition comprising polylactic acid, a thermoplastic resin, and a compatibilizing agent, wherein the compatibilizing agent is a polymeric material formed from a monomer ingredient comprising at least one alkyl methacrylate and has a weight-average molecular weight of 950,000 to 4,100,000. The alkyl methacrylate preferably is at least one member selected among methyl methacrylate, ethyl methacrylate, propyl methacrylate, and butyl methacrylate. When this vegetable resin composition is used to form a molded vegetable resin, this molded vegetable resin can have improved impact resistance and improved heat resistance. Said composition is made by compounding.

JP200632831 A published on Dec. 7, 2006 provides a foamed sheet of a thermoplastic resin, having excellent extrusion characteristics at production of the foamed sheet, also having excellent rigidity, modulus, heat insulation, cold resistance, cushioning characteristics and the like, and capable of being secondarily processed to various kinds of containers or the like; and to provide a method for producing the container having excellent heat resistance. The foamed sheet is obtained by using a resin composition as a raw material, obtained by compounding (D) a compatibilizer of 1-20 pts.wt. with the total of 100 pts.wt. of three components consisting of (A) a polylactic acid of 20-90 wt. %, (B) a polystyrene-based resin of 5-65 wt. % and (C) a polypropylene-based resin of 5-40 wt. %, and has 1.1-5.0 expansion ratio and 0.5-3.0 mm thickness.

It has now been discovered a very simple process to make a composition comprising a monovinylaromatic polymer and one or more dispersed phase(s) made of one or more bio-sourced polymer(s) such as poly(hydroxy carboxylic acids) and/or cyclic carbonates, possibly incorporating an epoxide and carbon dioxide. The monovinylaromatic monomer is preferably styrene and the bio-sourced polymer is preferably lactic acid or lactide, its cyclic dimer (3,6-dimethyl-1,4-dioxane-2,5-dione).

BRIEF DESCRIPTION OF THE INVENTION

The present invention is a process to make a composition comprising at least a monovinylaromatic polymer and at least a dispersed phase of one or more polymers made from renewable resources comprising:
a) forming a polymerizable mixture comprising:
  at least a monomer or a dimer (a1) selected among an hydroxy carboxylic acid, a precursor of said hydroxy carboxylic acid, a cyclic component polymerizable by ring-opening polymerization (ROP) and a mixture of an epoxide and carbon dioxide,
  dispersed in at least (a2) one monovinylaromatic monomer, optionally a rubber dissolved in (a2) the monovinylaromatic monomer,
b) contacting an appropriate catalyst with the polymerizable solution at conditions effective to produce a polymer A1 comprising the repeating units (a1) dispersed in the (a2) monovinylaromatic monomer,
c) polymerizing through a radical pathway the solution obtained at step b) optionally in the presence of a free radical initiator, optionally in the presence of chain transfer agents, to obtain a monovinylaromatic polymer A2 comprising a dispersed phase of the polymer A1,
d) degassing the product of step c) to separate the optional unpolymerized monomers and comonomers and recovering a composition comprising at least a (A2) monovinylaromatic polymer and at least (A1) wherein, the weight proportion A1/(A2+A1) is up to 50%.

The present invention is, in a second embodiment, a process to make a composition comprising at least a monovinylaromatic polymer and at least a dispersed phase of one or more polymers made from renewable resources comprising:

a) forming a polymerizable mixture comprising:
   at least a monomer or a dimer (a1) selected among an hydroxy carboxylic acid, a precursor of said hydroxy carboxylic acid, a cyclic component polymerizable by ring-opening polymerization (ROP) and a mixture of an epoxide and carbon dioxide,
   dispersed in at least (a2) one monovinylaromatic monomer,
   optionally a rubber dissolved in (a2) the monovinylaromatic monomer, b) contacting an appropriate catalyst with the polymerizable solution at conditions effective to essentially simultaneously produce a polymer A1 comprising the repeating units (a1) and a monovinylaromatic polymer A2, c) degassing the product of step b) to separate the optional unpolymerized monomers and comonomers and recovering a composition comprising at least a (A2) monovinylaromatic polymer and at least (A1) wherein, the weight proportion A1/(A2+A1) is up to 50%.

In both above embodiments one or more comonomers copolymerizable with the monovinylaromatic monomer may be present. In the present description and claims said poly(monovinylaromatic monomer and one or more comonomers) is also referred as monovinylaromatic polymer.

In both above embodiments the hydroxy carboxylic acid may be replaced in whole or in part by an hydroxy carboxylate.

The particles of the dispersed phase A1 can contain monovinylaromatic polymer inclusions, which means any particle of A1 may contain itself at least one sub-particle of monovinylaromatic polymer.

In the optional case where a rubber has been incorporated in the initial formulation, the rubber and polymer A1 phases are present as independent particles characterized by a more or less spherical shape and dispersed within the PS continuous phase. Both the rubber and polymer A1 particles may contain at least one sub-particle of occluded vinyl aromatic polymer. Rubber and polymer A1 particles containing a single encapsulated sub-particle of vinyl aromatic polymer—also called "occlusion"—are typically referred as capsule or "core-shell" particles, whereas those containing at least 2 vinyl-aromatic occluded particles are of the so-called "salami" morphology type. These two types of dispersed phase morphologies can be encountered whatever the dispersed phase considered in the product obtained according to the present invention. Depending on the level of grafting of both the polymer A1 and the optional rubber, core-shell, salami or other morphologies (e.g. labyrinths, onions, rods, droplets . . . ) may be generated.

DETAILED DESCRIPTION OF THE INVENTION

As regards the hydroxy carboxylic acid monomer, it is preferably obtained from renewable resources such as corn and sugar cane or other sugar- or starch-producing plants. The term "poly(hydroxy carboxylic acid)" includes homo- and co-polymers herein and blends of one or more such polymers.

The hydroxy carboxylic acid can be represented as in Formula I:

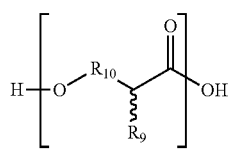

Formula I wherein, R9 is hydrogen or a branched or linear alkyl comprising from 1 to 12 carbon atoms and R10 is optional and can be a branched, cyclic or linear alkylene chains comprising from 1 to 12 carbon atoms The monomeric repeating unit is not particularly limited, as long as it is aliphatic and has a hydroxyl residue and a carboxyl residue. Examples of possible monomers include lactic acid, glycolic acid, 3-hydroxybutyric acid, 4-hydroxybutyric acid, 4-hydroxyvaleric acid, 5-hydroxyvaleric acid and 6-hydroxycaproic acid.

The monomeric repeating unit may also be derived from a cyclic monomer or cyclic dimer of the respective aliphatic hydroxycarboxylic acid. Examples of these include lactide, glycolide, β-propiolactone, β-butyrolactone, γ-butyrolactone, γ-valerolactone, δ-valerolactone, ε-caprolactone and the like. The cyclic monomer and the cyclic dimer are also referred as "precursor" of the hydroxy carboxylic acid.

In the case of asymmetric carbon atoms within the hydroxy carboxylic acid unit, each of the D-form and the L-form as well as mixtures of both may be used. Racemic mixtures can also be used. By way of example the D,D-lactide is the cyclic dimer made of two D-lactic acid, the L,L-lactide is the cyclic dimer made of two L-lactic acid, the meso lactide is the dimer made of one D-lactic acid and one L-lactic acid. L,D-lactide designates a racemic mixture of L,L-lactide and D,D-lactide.

The poly(hydroxy carboxylic acid) may optionally comprise one or more comonomer(s). The comonomer can be a second different hydroxycarboxylic acid as defined above in Formula I. The weight percentage of each hydroxycarboxylic acid is not particularly limited. The comonomer can also comprise dibasic carboxylic acids and dihydric alcohols. These react together to form aliphatic esters, oligoesters or polyesters as shown in Formula II having a free hydroxyl end group and a free carboxylic acid end group, capable of reacting with hydroxy carboxylic acids, such as lactic acid and polymers thereof.

Formula II wherein
R11 and R12 are branched or linear alkylenes comprising from 1 to 12 carbon atoms and can be the same or different;
"t" represents the number of repeating units T and is any integer of at least 1

The weight percentages of each monomer i.e. the hydroxycarboxylic acid monomer and the aliphatic ester, oligoester or polyester comonomer of Formula II are not particularly limited. Preferably, the poly(hydroxy carboxylic acid) comprises at least 50% by weight (wt %) of hydroxycarboxylic acid monomers and at most 50 wt % of aliphatic ester, oligoester or polyester comonomers.

The dihydric alcohols and the dibasic acids that can be used in the aliphatic polyester unit as shown in Formula II are not particularly limited. Examples of possible dihydric alcohols include ethylene glycol, diethylene glycol, triethyleneglycol, propylene glycol, dipropylene glycol, 1,3-butanediol, 1,4-butanediol, 3-methyl-1,5-pentanediol, 1,6-hexanediol, 1,7-octanediol, 1,9-nonanediol, neopentyl glycol, 1,4-cyclohexanediol, isosorbide and 1,4-cyclohexane dimethanol and mixtures thereof.

Aliphatic dibasic acids include succinic acid, oxalic acid, malonic acid, glutaric acid, adipic acid, pimelic acid, suberic acid, azelaic acid, sebacic acid; undecanoic diacid, dodecanoic diacid and 3,3-dimethylpentanoic diacid, cyclic dicarboxylic acids such as cyclohexanedicarboxylic acid and mixtures thereof. The dibasic acid residue in the hydroxy carboxylic acid copolymer can also be derived from the equivalent diacylchlorides or diesters of the aliphatic dibasic acids.

In the case of asymmetric carbon atoms within the dihydric alcohol or the dibasic acid, the D-form and the L-form as well as mixtures of both may be used. This includes the possibility of using racemic mixtures.

As regards the cyclic component polymerizable by ring-opening polymerization (ROP), one can cite the lactones and the lactides above described as precursors of the hydroxy carboxylic acids.

Other cyclic components polymerizable by ring-opening polymerization are the cyclic carbonates and advantageously the 5- to 7-membered cyclic carbonates. Preferably, this polymerization process is operative for 5- and 6-membered cyclic carbonates. As non-limitative examples, one can cite: trimethylenecarbonate (TMC), 2-benzyloxy-trimethylenecarbonate (BTMC), 2-hydroxy-trimethylenecarbonate (TMCOH), 4-(benzyloxymethyl)-1,3-dioxolan-2-one (BDMC), 4-(hydroxymethyl)-1,3-dioxolan-2-one (DMCOH). In particular, one can cite cyclic carbonates such as 2-oxy-trimethylenecarbonate (OTMC), dehydrotrimethylenecarbonate (DHTMC) and 2,2 dimethoxy trimethylene carbonate (TMC(OMe)$_2$).

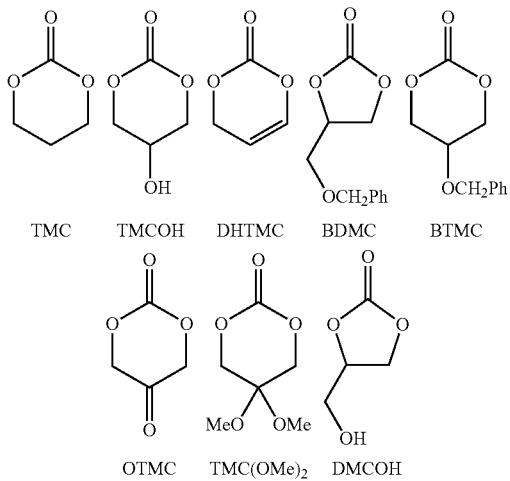

TMC   TMCOH   DHTMC   BDMC   BTMC

OTMC   TMC(OMe)$_2$   DMCOH

Ring opening polymerization of trimethylene carbonate is as follows:

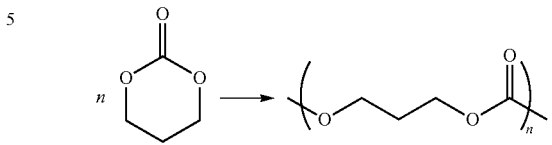

As regards the mixture of an epoxide and carbon dioxide, one can cite the mixtures of epoxides and carbon dioxide cited in Angew. Chem. Int. Ed. 2004, 43, 6618-6639/www.angewandte.org/_2004 Wiley-VCH Verlag GmbH & Co. KGaA, Weinheim, the content of which is incorporated in the present invention.

As regards the monovinylaromatic monomer, it relates to any aromatic bearing a vinyl function. By way of example, mention may be made of styrene, vinyl toluene, alphamethylstyrene, alphaethylstyrene, methyl-4-styrene, methyl-3-styrene, methoxy-4-styrene, hydroxymethyl-2-styrene, ethyl-4-styrene, ethoxy-4-styrene, dimethyl-3,4-styrene, chloro-2-styrene, chloro-3-styrene, chloro-4-methyl-3-styrene, tert.-butyl-3-styrene, dichloro-2,4-styrene, dichloro-2,6-styrene, vinyl-1-naphtalene and vinylanthracene. It would not depart from the scope of the invention to use more than one monovinylaromatic monomer. A part of the monovinylaromatic monomer may be replaced by unsaturated monomers copolymerizable with styrene. By way of example mention may be made of alkyl esters of acrylic or methacrylic acid, acrylonitrile and methacrylonitrile. The proportion of comonomer may be from 0 to 50% by weight for respectively 100 to 50% of the monovinylaromatic monomer. In a specific embodiment the monovinylaromatic polymer comprises:

i) from 60 to 100 weight % of one or more $C_{8-12}$ monovinylaromatic monomers; and ii) from 0 to 40 weight % of one or more monomers selected from the group consisting of $C_{1-4}$ alkyl esters of acrylic or methacrylic acid and acrylonitrile and methacrylonitrile.

As regards the rubber, mention may be made of EPR (the abbreviation for ethylene-propylene rubber or ethylene-propylene elastomer), EPDM (the abbreviation for ethylene-propylene-diene rubber or ethylene-propylene-diene elastomer), polybutadiene, acrylonitrile-butadiene copolymer, polyisoprene, isoprene-acrylonitrile copolymer, SBR (Styrene butadiene rubber), styrenic block copolymers with a hydrogenated midblock of styrene-ethylene/butylene-styrene (SEAS) or styrene-ethylene/propylene-styrene (SEPS), and any copolymer having styrene blocks. More particularly the copolymers having styrene blocks are advantageously copolymers with styrene blocks and blocks made of butadiene or isoprene or of a mixture butadiene/isoprene. These block copolymers can be linear block copolymers or star block copolymers, hydrogenated and/or functionalized. These copolymers are described in ULLMANN'S ENCYCLOPEDIA OF INDUSTRIAL CHEMISTRY, fifth edition (1995) Vol A26, pages 655-659. They are sold by Total Petrochemicals under the trade mark Finaclear®, by BASF under the trade mark Styrolux®, by Kraton under the trade name of Kraton® D, and under the trade mark K-Resin® by Chevron Phillips Chemical.

By way of example the rubber can be selected from the group consisting of:

a) co- and homopolymers of $C_{4-6}$ conjugated diolefins, b) copolymers comprising from 60 to 85 weight % of one or more $C_{4-6}$ conjugated diolefins and from 15 to 40 weight % of a monomer selected from the group consisting of acrylonitrile and methacrylonitrile and c) copolymers comprising from 20 to 60, preferably from 40 to 50 weight % of one or more $C_{8-12}$ vinyl aromatic monomers which are unsubstituted or substituted by a $C_{1-4}$ alkyl radical and from 60 to 40, preferably from 60 to 50 weight % of one or more monomers selected from the group consisting of $C_{4-6}$ conjugated diolefins. The rubber may be prepared by a number of methods, preferably by emulsion or solution polymerization. These processes are well known to those skilled in the art. It would not depart from the scope of the invention to use more than one rubber.

As regards step b) in the first embodiment of the invention, an appropriate catalyst is contacted with the polymerizable solution at conditions effective to produce a polymer A1 comprising the repeating units (a1) dispersed in the (a2) monovinylaromatic monomer.

It is recommended to make the polymerization at moderate temperature to prevent the polymerization of the monovinylaromatic monomer. Advantageously said temperature is below 100° C., preferably below 60° C. and most preferably at 20-40° C. The catalysts that can be used are e.g. organo catalysts or metal catalysts.

As organo catalysts that can be cited: lipase enzyme, 4-aminopyridines (e.g. 4-dimethylaminopyridine, 4-pyrrolidinepyridine), trifluoromethanesulfonic acid, or thioureaamine catalysts as described in D. Bourissou et al., *C. R. Chimie* 10 (2007), p. 775-794 and in "Organocatalytic Ring-Opening Polymerization", Kamber et al., *Chemical Reviews*, March 2007.

As metal catalysts that can be cited: Lanthanide (Group II, e.g. Y, La, Nd,)-based catalyst as those described in WO 2007/057422 or in Feijin et al., *Macromolecules*, (1996) 29, p. 6132, Carpentier et al., *Chem. Comm.* (2004), p. 330 and *Chem. Eur. J.* (2006) 12, p. 169; Zinc-based catalysts with diaminophenolate ligand as in Tolman et al., *JACS*, (2003) 125, p. 11350.

As regards step c) in the first embodiment of the invention, in said step the solution obtained at step b) is polymerized optionally in the presence of a free radical initiator, optionally in the presence of chain transfer agents.

It can be carried out in a conventional manner by bulk polymerization, solution polymerization, or polymerization in aqueous dispersion. Advantageously the process of the invention is carried out as a diluted bulk polymerization process. When using diluted bulk polymerization, the starting solution may be mixed with up to about twenty percent (20%) by weight, based on the monovinylaromatic monomer employed, of an inert solvent so as to lower the polymerization bulk viscosity, to moderate polymerization heat and to improve thermal exchanges and heat homogeneity within the bulk. Suitable diluents include aromatic solvents such as ethylbenzene, toluene, xylenes, cyclohexane, and aliphatic hydrocarbon solvents, such as dodecane, and mixtures thereof. The diluent can also consists of a mixture of the abovementioned solvents, or a mixture of one of these solvents with the vinylaromatic monomer used for the purpose of the present invention. In that latter case, the diluent is typically made of recycled solvent and unreacted vinylaromatic monomer, often referred as "recycles". Any solvent useful to improve heat homogeneity within the bulk during polymerization, that can be removed after polymerization of the monovinylaromatic monomer, and that does not interfere with the polymerization of the monovinylaromatic monomer and the optional comonomer(s), can be used with the process of the present invention.

Suitable chain transfer agents, e.g. mercaptans or alphamethyl styrene dimer, may also be added to control polymer molecular weight and the particles size of the poly(hydroxy carboxylic acid) and optional rubber.

The polymer A1 (or the polymer A1 and the rubber) is dispersed or "dissolved" in the monovinylaromatic monomer. Monovinylaromatic polymer is initially formed from the monovinylaromatic monomer within the homogeneous polymer A1 (or polymer A1 and rubber) solution or dispersion in monovinylaromatic monomer. At the beginning of the polymerization the reacting solution is at a point prior to the polymer A1 (or polymer A1 and rubber)/monovinylaromatic monomer inversion point, i.e. the point at which the solution being reacted goes from monovinylaromatic polymer particles in a polymer A1 (or polymer A1 and rubber)/monovinylaromatic monomer matrix to polymer A1 (or polymer A1 and rubber) particles in a monovinylaromatic polymer matrix. In other words when the monovinylaromatic polymer phase volume fraction approximately equals the polymer A1 (or polymer A1 and rubber) phase volume fraction, a phase inversion occurs e.g. the monovinylaromatic monomer/monovinylaromatic polymer phase becomes continuous and the polymer A1 (or polymer A1 and rubber) phase becomes discontinuous.

When there is no rubber, monovinylaromatic monomer is polymerized around and within the polymer A1 particles which leads to monovinylaromatic polymer inclusions in the polymer A1 particles.

A portion of the monovinylaromatic monomer is polymerized by grafting on the polymer A1 (or polymer A1 and rubber) due to the presence in the polymer A1 macromolecules of labile hydrogen atoms that can be easily abstracted in the presence of active radicals (possibly coming from the initiator). Hydrogen atoms-abstraction from polymer A1 macromolecules results in the in situ production of polymer A1-grafted-monovinylaromatic copolymers that act as emulsifier for the polymer A1-in-monovinylaromatic monomer phase dispersed within the monovinylaromatic polymer-in monovinylaromatic monomer continuous phase. These polymer A1-grafted-monovinylaromatic copolymers are compatibilizers of the polymer A1 and monovinylaromatic polymer.

This process leads to polymer A1 dispersed phase morphologies very similar to the rubber phase morphologies that can be obtained in convention HiPS (High Impact Polystyrene) process: depending on the polymer A1 grafting Level, polymer A1 morphologies can consists of salami-like or capsule (core-shell) particles. The polymer A1 grafting level can be easily adjusted by introducing in the polymerization bulk adapted initiators or grafting promoters, such as organic peroxides (e.g. 1,1-di-(t-butylperoxy)cyclohexane; 1,1-di-(t-amylperoxy)cyclohexane); 1,1-di-(t-butylperoxy)-3,3,5-trimethyl-cyclohexane; 00-t-amyl-0-(2-ethylhexyl monoperoxy-carbonate); OO-t-butyl O-isopropyl monoperoxycarbonate; OO-t-butyl-0-(2-ethylhexyl)monoperoxycarbonate; butyl 4,4-di(t-butylperoxy)valerate; Ethyl 3,3-Di-(t-butylperoxy)butyrate; and mixtures thereof), hydroperoxides, singlet-oxygen ($^1O_2$) or amine-complexed boranes possibly in combination with the above mentioned peroxides. Grafting promoter amounts are typically within the 0-1000 ppm range.

When the rubber is present, most of the polymer A1 generates a secondary population of dispersed particles. These dispersed polymer A1 particles may entrap at least one occluded monovinyl aromatic polymer sub-particles and exhibit the particle inner morphologies typically encountered in the conventional HiPS process, e.g. salami, capsule, labyrinth, rod or droplet morphologies.

In this specific process, the compositions of the invention can be produced batchwise or continuously in a series of continuously stirred tank reactors (CSTR) and/or plug-flow reactors; the reactor wherein phase inversion occurs being called "inversion reactor". The reactors downstream of the inversion reactor allow the vinylaromatic monomer polymerization to proceed further.

As regards step d) in the first embodiment of the invention, in said step d) is made the degassing of the product of step c) to separate the optional unpolymerized monomers and comonomers and recovering a composition comprising at least a (A2) monovinylaromatic polymer and at least (A1).

The reactors downstream of the inversion reactor in step c) allow the vinylaromatic monomer polymerization to proceed further until a solid content sufficiently high (typically 60-90% wt) for degassing the composition of the invention using the conventional flash-devolatilization or vacuum-extrusion technologies. A monovinyl aromatic polymer material containing polymer A1 is obtained therefrom.

As regards step b) in the second embodiment of the invention, an appropriate catalyst is contacted with the polymerizable solution of step a) at conditions effective to essentially simultaneously produce a polymer A1 comprising the repeating units (a1) and a monovinylaromatic polymer. Said simultaneous polymerization can be made in the same reactors used in step c) of the first embodiment of the present invention. The reactor or, in case of a plurality of reactors, the first reactor (by way of example a plug-flow or a CSTR) is set at a temperature of at least 120'C. The polymerization of a(1) is advantageously catalyzed by any catalyst suitable for an esterification.

Tin-2-ethyl-hexanoate or Sn(Oct)2 can be used to polymerize (a1), the monovinylaromatic monomer polymerizes with the temperature. An alcohol (e.g. 1-butanol) can be used as the activator and chain transfer agent for the polymerization of (a1). Advantageously the initial molar ratio of the catalyst to (a1) or precursor thereof is of 0.001 to 0.01. Advantageously the initial molar ratio of the alcohol to the catalyst is of 0.01 to 2.

The esterification catalyst can be also a derivative of a metal (M) chosen from the group formed by titanium, zirconium and hafnium. Examples of derivatives which may be mentioned are tetraalkoxides corresponding to the general formula $M(OR)_4$, in which M represents titanium, zirconium or hafnium and the radicals R, which may be identical or different, denote linear or branched alkyl radicals containing from 1 to 24 carbon atoms.

The $C_1$ to $C_{24}$ alkyl radicals, from which the radicals R in the tetraalkoxides used as catalysts in the process according to the invention are chosen, are, for example, alkyl radicals such as methyl, ethyl, propyl, isopropyl, butyl, ethylhexyl, decyl, dodecyl or hexadodecyl. The preferred catalysts are the tetraalkoxides for which the radicals R, which may be identical or different, are $C_1$ to $C_8$ alkyl radicals. Examples of such catalysts are, in particular, $Z_r(OC_2H_5)_4$, $Z_r(O\text{-}isoC_3H_7)_4$, $Z_r(OC_4H_9)_4$, $Z_r(OC_5H_{11})_4$, $Z_r(OC_6H_{13})_4$, $H_f(OC_2H_5)_4$, $H_f(OC_4H_9)_4$ and $H_f(O\text{-}isoC_3H_7)_4$.

The catalyst can consist solely of one or more of the tetraalkoxides of formula $M(OR)_4$ defined above. It can also be formed by the combination of one or more of these tetraalkoxides with one or more alkali metal alkoxides or alkaline-earth metal alkoxides of formula $(R_1O)_pY$ in which $R_1$ denotes a hydrocarbon-based residue, advantageously a $C_1$ to $C_{24}$ and preferably $C_1$ to $C_8$ alkyl residue, Y represents an alkali metal or alkaline-earth metal and p is the valency of Y. The amounts of alkali metal or alkaline-earth metal alkoxide and of zirconium or hafnium tetraalkoxides which are combined to constitute the mixed catalyst can vary within a wide range. However, it is preferred to use amounts of alkoxide and of tetraalkoxides such that the molar proportion of alkoxide is substantially equal to the molar proportion of tetraalkoxide.

The weight proportion of catalyst, i.e. of the tetraalkoxide(s) when the catalyst contains no alkali metal alkoxide or alkaline-earth metal alkoxide, or alternatively of all of the tetraalkoxide(s) and of the alkali metal or alkaline-earth metal alkoxide(s) when the catalyst is formed by a combination of these two types of compounds, advantageously ranges from 0.01% to 5% relative to the weight of the hydroxy carboxylic acid or its precursor.

Examples of other derivatives which may also be mentioned are salts of the metal (M), in particular salts of (M) and of an organic acid, and complex salts between the oxide of (M) and/or the hydroxide of (M) and an organic acid. The organic acid may advantageously be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid and crotonic acid. Acetic acid and propionic acid are particularly preferred. M is advantageously zirconium. These salts can be referred to as zirconyl salts. Without being bound by this explanation, the Applicant believes that these salts of zirconium and of an organic acid or the complex salts mentioned above release $ZrO^{++}$ during the process. The product sold under the name zirconyl acetate is used. The amount to be used is the same as for the derivatives $M(OR)_4$.

When (a1) is a lactide tin-2-ethyl-hexanoate or $Sn(Oct)_2$ is used as the lactide ROP (Ring Opening Polymerization) catalyst, the monovinylaromatic monomer polymerizes with the temperature. An alcohol (e.g. 1-butanol) is used as the activator and chain transfer agent for lactide ROP.

Advantageously (Sn(Oct)2)/(lactide) initial molar ratio of 0.001 to 0.01 and (Alcohol)/(Sn(Oct)2) initial molar ratio is of 0.01 to 2.

The polymerization of the monovinyl aromatic monomer can be made optionally in the presence of a free radical initiator (e.g. a peroxide), optionally in the presence of chain transfer agents.

The polymerization of step b) can be carried out in a conventional manner by bulk polymerization, solution polymerization, or polymerization in aqueous dispersion in a similar way as the step c) of the first embodiment of the invention described above. Advantageously the process of the invention is carried out as a diluted bulk polymerization process. When using diluted bulk polymerization, the starting solution may be mixed with up to about twenty percent (20%) by weight, based on the monovinylaromatic monomer employed, of an inert solvent so as to lower the polymerization bulk viscosity, to moderate polymerization heat and to improve thermal exchanges and heat homogeneity within the bulk.

When there is no rubber, monovinylaromatic monomer is polymerized around and within the polymer A1 particles which leads to monovinylaromatic polymer inclusions in the polymer A1 particles.

A portion of the monovinylaromatic monomer is polymerized by grafting on the polymer A1 (or polymer A1 and rubber) due to the presence in the polymer A1 macromolecules of labile hydrogen atoms that can be easily abstracted in the presence of active radicals (possibly coming from the initiator). Hydrogen atoms-abstraction from polymer A1 macromolecules results in the in situ production of polymer A1-grafted-monovinylaromatic copolymers that act as emulsifier for the polymer A1-in-monovinylaromatic monomer phase dispersed within the monovinylaromatic polymer-in monovinylaromatic monomer continuous phase. These polymer A1-grafted-monovinylaromatic copolymers are compatibilizers of the polymer A1 and monovinylaromatic polymer.

This process leads to polymer A1 dispersed phase morphologies very similar to the rubber phase morphologies that can be obtained in convention HiPS (High Impact Polystyrene) process. Depending on the polymer A1 grafting level, polymer A1 morphologies can consists of salami-like or capsule (core-shell) particles. The polymer A1 grafting level can be easily adjusted by introducing in the polymerization bulk adapted initiators or grafting promoters, such as organic peroxides (already described above in step c) of the first embodiment).

When the rubber is present, most of the polymer A1 generates a secondary population of dispersed particles. These dispersed polymer A1 particles may entrap at least one occluded monovinyl aromatic polymer sub-particles and exhibit the particle inner morphologies typically encountered in the conventional HIPS process, e.g. salami, capsule, labyrinth, rod or droplet morphologies.

In this specific process, the compositions of the invention can be produced batchwise or continuously in a series of continuously stirred tank reactors (CSTR) and/or plug-flow reactors As regards step c) in the second embodiment of the invention, in said step c) is made the degassing of the product of step b) to separate the optional unpolymerized monomers and comonomers and recovering a composition comprising at least a (A2) monovinylaromatic polymer and at least (A1) a polymer A1. The polymerization of step c) is advantageously processed until a solid content sufficiently high (typically 60-90% wt) for degassing the composition of the invention using the conventional flash-devolatilization or vacuum-extrusion technologies. A monovinyl aromatic polymer material containing polymer A1 is obtained therefrom.

As regards the weight proportion A1/(A2+A1), it is advantageously up to 30%, preferably up to 20%.

Advantageously the weight proportions of the monovinylaromatic polymer composition are:
50 to 99% of monovinylaromatic polymer,
1 to 50% of polymer A1,
0 to 35% of rubber,
with the condition that the proportions of polymer A1+rubber is 1 to 50% for respectively 99 to 50% of monovinylaromatic polymer.

Preferably the weight proportions of the monovinylaromatic polymer composition are:
70 to 99% of monovinylaromatic polymer,
1 to 30% of polymer A1,
0 to 25% of rubber,
with the condition that the proportions of polymer A1+rubber is 1 to 30% for respectively 99 to 70% of monovinylaromatic polymer.

More preferably the weight proportions of the monovinylaromatic polymer composition are:
80 to 99% of monovinylaromatic polymer,
1 to 20% of polymer A1,
0 to 15% of rubber,
with the condition that the proportions of polymer A1+rubber is 1 to 20% for respectively 99 to 80% of monovinylaromatic polymer.

More preferably the weight proportions of the monovinylaromatic polymer composition are:
80 to 95% of monovinylaromatic polymer,
5 to 20% of polymer A1,
0 to 15% of rubber,
with the condition that the proportions of polymer A1+rubber is 5 to 20% for respectively 95 to 80% of monovinylaromatic polymer.

In addition to the monovinylaromatic polymer, the polymer A1 and the rubber, the monovinylaromatic polymer composition of the invention can comprise additives. Exemplary additives include fillers such as chain transfer agents, talc or any mineral filler organoclays (clays wetted by an organic compatibilizer), anti-oxidants, UV stabilizers, lubricants, mineral oil, silicon oil, vegetable oil, PE, PP or PTFE waxes, plasticizers, pigments, carbon black, flame retardants and the like. Any additive known to be useful in monovinylaromatic polymers to those of ordinary skill in the art of such polymers can be used within the present invention.

The monovinylaromatic polymer compositions of the present invention are useful as environmental-friendly substitutes of general purpose monovinylaromatic polymer (by way of example GPPS) or high-impact monovinylaromatic polymer (by way of example HiPS), insofar as they incorporate a fraction of material made from renewable resources. They may be foamed, extruded & thermoformed or injected & moulded to form articles similar to those commonly made of GPPS, HiPS, or ABS. More particularly, they can be wisely used for making food packagings or disposable items which can be burnt after use for producing heat or electricity. In that case, the green-house gas balance is more favourable compared to conventional styrenic polymers as a part of the material was made from vegetable-origin resources and $CO_2$ was captured from the atmosphere during their cultivation. The resulting polymeric materials can be used in various uses including (non exhaustive list) fridge liners, TV front and back covers, households, electronic and electric appliances, dairy cups, food packagings, insulation foams, etc. . . .

What is claimed:

1. A process to make a composition comprising at least a monovinylaromatic polymer and at least a dispersed phase of one or more polymers made from renewable resources comprising:
    a) forming a polymerizable mixture comprising:
        at least a monomer or a dimer (a1) selected among a hydroxy carboxylic acid, a precursor of said hydroxy carboxylic acid, and a cyclic component polymerizable by ring-opening polymerization (ROP),
        wherein the monomer or the dimer (a1) is dispersed in at least (a2) one monovinylaromatic monomer,
    b) contacting a catalyst with the polymerizable mixture at conditions effective to produce a polymer A1 comprising the repeating units (a1) dispersed in the (a2) monovinylaromatic monomer,
    c) polymerizing through a radical pathway the solution obtained at step b) in the presence of a free radical initiator and in the presence of chain transfer agents, to obtain a monovinylaromatic polymer A2 comprising a dispersed phase of the polymer A1,
    d) degassing the product of step c) to separate unpolymerized monomers and comonomers and recovering a composition comprising at least the (A2) monovinylaromatic polymer and at least (A1) wherein, the weight proportion A1/(A2+A1) is up to 50%.

2. The process according to claim 1, wherein the polymerization of (a1) at step b) thereof is made below 100° C.

3. The process according to claim 2, wherein the polymerization of (a1) at step b) is made below 60° C.

4. The process according to claim 3, wherein the polymerization of (a1) at step b) is made at 20-40° C.

5. The process according to claim 1, wherein the catalyst used at step b) comprises organo catalysts or metal catalysts.

6. The process according to claim 1, wherein (a1) is a lactide.

7. The process according to claim 1, wherein the weight proportion A1/(A2+A1) is up to 30%.

8. The process according to claim 7, wherein the weight proportion A1/(A2+A1) is up to 20%.

9. The process according to claim 1, wherein the polymerizable mixture further comprises a mixture of an epoxide and carbon dioxide.

10. The process according to claim 1, wherein the polymerizable mixture further comprises a rubber dissolved in (a2) the monovinylaromatic monomer.

* * * * *